May 27, 1924.    1,495,243

J. BRANDWOOD ET AL
APPARATUS FOR THE DYEING OR ANALOGOUS TREATMENT OF TEXTILES
Filed Feb. 6, 1923

Inventors
John Brandwood
Thomas Brandwood
Joseph Brandwood
By J. O'Connell
Their Attorney Patented May 27, 1924.

1,495,243

UNITED STATES PATENT OFFICE.

JOHN BRANDWOOD, THOMAS BRANDWOOD, AND JOSEPH BRANDWOOD, OF BURY, ENGLAND.

APPARATUS FOR THE DYEING OR ANALOGOUS TREATMENT OF TEXTILES.

Application filed February 6, 1923. Serial No. 617,287.

*To all whom it may concern:*

Be it known that we, JOHN BRANDWOOD, THOMAS BRANDWOOD, and JOSEPH BRANDWOOD, subjects of the King of Great Britain and Ireland, and residents of Elton, Bury, in the county of Lancaster, England, have invented certain Improvements in and Relating to Apparatus for the Dyeing or Analogous Treatment of Textiles, of which the following is a specification.

In our prior specification accompanying application for United States Letters Patent under Serial Number 531,391 filed the 24th day of January, 1922, we have described and claimed inter alia a particular form of perforated cylinder for use in apparatus for the dyeing and analogous treatment of textile fibres in the loose state, that is, prior to carding and spinning, said apparatus being suitable for the carrying out of the process of dyeing and the like described and claimed in the specification to United States Letters Patent No. 1,432,318.

The present invention which is an improvement in or modification of that claimed in specification of Serial No. 531,391 aforesaid has for object a particular form of perforated cylinder, the construction of such cylinder being such that friction is greatly minimized with decrease of wear and tear upon the double conveyor which rotates the cylinders in the apparatus by frictional contact therewith as the said conveyor passes through the apparatus.

In carrying the present invention into effect we dispense with the semi-cylindrical shield described in the specification to application No. 531,391—and which shield serves to close in a positive manner all perforations in the rotating cylinder which are not closed by the conveyor and by the material carried thereby—and substitute therefor a stationary partition extending longitudinally and diametrically of the cylinder, thus effectually separating the upper half of the cylinder, at any point in the rotation of the latter, from the lower half thereof. A fixed central tubular shaft is provided for the cylinder, this shaft having openings giving access to one longitudinal half of the cylinder of fluid from the pump. The cylinder rotates on central bearings whilst allowing free communication between the central tubular shaft and the fluid circulating means.

The invention will now be fully described with reference to the accompanying drawings, wherein:—

Figure 1:
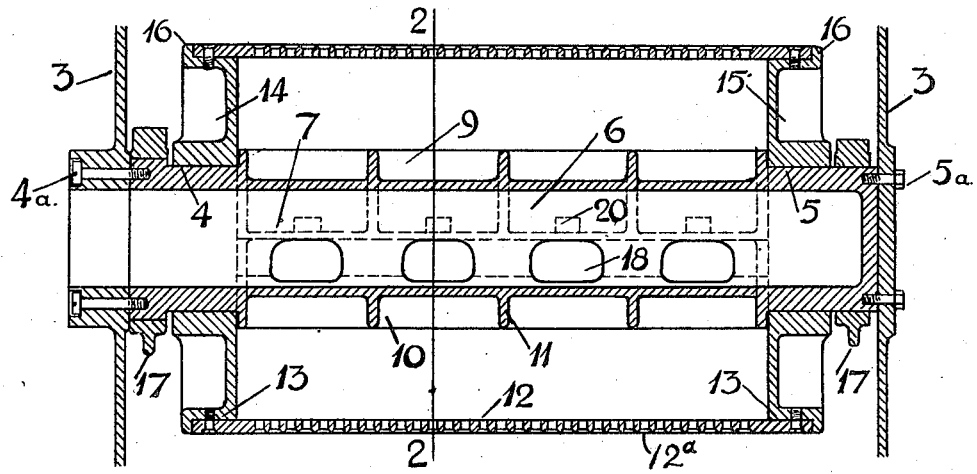
Figure 2:
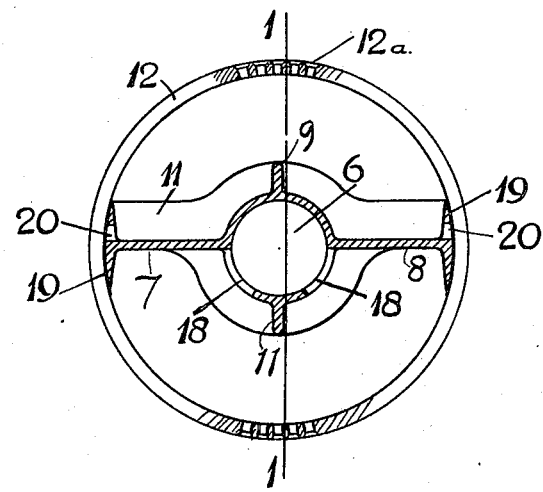

Figure 1 is a longitudinal section of the cylinder and its bearings and accessories, taken on the line 1—1 of Figure 2; and Figure 2 is a cross section taken on the line 2—2 of Figure 1.

In the drawings, 3 are the side walls of a treatment tank within which the cylinder is fitted, and which tank has the guide and drawing rollers and other appurtenances as described in our prior specification Serial No. 531,391. 4, 5, are bearings fitted by means of screw bolts $4^a$, $5^a$ within the tank and to the side wall thereof, the bearing 4 having a central bore as shown. The bearings 4 and 5 are formed integral with a tubular central shaft 6. The shaft 6 has radial flanges 7, 8 formed thereon or secured thereto in any known and convenient manner, the flanges being formed parallel one with the other. Longitudinal webs 9, 10 are also provided on the shaft 6, being formed integral therewith or being secured thereto, these webs and the tubular shaft 6 having transverse strengthening members 11 formed with or connected to them at regular intervals, as shown. 12 is a cylindrical shell of nickel or nickel alloy or other suitable non-corrosive metal, the ends of which fit tightly within a recess 13 formed in each of two end closers 14, 15 and abutting against the face of the peripheral flange 16 of each end member 14, 15. The entire surface of the cylindrical shell 12 is perforated as indicated at $12^a$. The closing members 14, 15 may be of non-corrodible metal or when desired they may be of cast iron or other suitable metal. They are preferably formed of the recessed section shown in Figure 1 for lightness and strength, but obviously they may be of any suitable section. Each closing member 14, 15 has a central bore the diameter of which is sufficient to enable the said member to fit upon the central bearings 4, 5 with an easy rotating fit, and as will be seen in Figure 1, one of the transverse strengthening members 11 of the tubular shaft 6 abuts closely against the internal wall of each of the closing members 14 and 15 and against the bearings 4, 5, thus forming a cover for the joint between an end closing member and its bearing. End rings 17 are fitted as shown around the bearings 4 and 5 as additional supports therefor, these end rings being bolted to the tank wall or resting on brackets (not shown) within the tank. The tubular shaft 6 is formed with openings 18 to give access to the cylinder interior of fluid entering the said shaft from fluid circulating means placed exteriorly of the tank, or vice versa.

In operation, the conveyor described in our prior specification passes over a portion of the surface 12 of the perforated cylinder, being drawn through the apparatus by gearing external to the tank. Friction between the said conveyor and the cylinder surface with which it is in contact is sufficient to rotate the said cylinder, and the fluid circulating means, also described in our said prior specification, draws fluid from the tank through the material carried by the conveyor and through the perforations in the cylindrical shell which are covered by the conveyor, to the interior of the cylinder. Any fluid entering the perforations 12ª which are not covered by the conveyor and its contained material is prevented from circulating by the flanges 7, 8 which form a fixed dividing partition dividing the rotating cylinder into two semi-cylindrical chambers.

To ensure a practical fluid tight joint between the inner face of the cylindrical shell 12 and the edges of the flanges 7, 8, which form the longitudinal partition within the said shell, we form at the ends of said flanges the longitudinal shoes 19, 19 curved on their outer faces to correspond to the curvature of the cylinder. The shoes 19, 19 extend some distance above and below the central diametral line of the cylinder, so that as the conveyor of our prior specification makes contact with the cylindrical surface, (such contact as pointed out in the said prior specification being upon a surface of less than 180 degrees) any perforations 12ª on that side of the central diametral line which are not covered by the conveyor are closed by a portion of a shoe 19. An outlet 20 may be formed in one or both of the shoes 19, to allow liquor to drain from the interior of the cylinder and through perforations 12ª to the tank, when the latter is empty and the rotation of the cylinder stopped.

It will be obvious that the mechanical details hereinbefore given may be varied without departing from the spirit of the invention as set forth in the appended claims.

We claim:—

1. Perforated cylinders and bearings therefor for use in apparatus for the treatment of textile materials contained between the bands of a double conveyor, comprising an outer perforated shell, end closers for the said shell, central bearings for the said end closers upon which the latter may rotate, and a fixed central tubular shaft bearing horizontal flanges to form a partition longitudinally separating one portion of the cylinder, at any stage in its rotation, from the other portion, and means for allowing access of fluid from a fluid circulating means to one only of the said cylinder portions.

2. Perforated cylinders and bearings therefor for use in apparatus for the treatment of textile materials contained between the bands of a double conveyor, comprising an outer perforated shell, end closers for the said shell, a bearing for each end closer of the shell upon which the cylinder may rotate, one of the bearings being recessed to receive the end of a fixed central tubular shaft and the other having a central bore to allow of access of fluid to the said shaft, openings in the said shaft to allow of the access of said fluid to the interior of the cylinder, and a longitudinal partition dividing and cutting off one portion of the cylinder from the other portion at any stage in its rotation.

3. Perforated cylinders and bearings therefor for use in apparatus for the treatment of textile materials contained between the bands of a double conveyor, comprising an outer perforated shell, end closers for the said shell, a bearing for each end of the shell, upon which the cylinder may rotate, one of the bearings being recessed to receive the end of a fixed central tubular shaft and the other having a central bore to allow of access of fluid to the said shaft, openings in the said shaft to allow of the access of said fluid to the interior of the cylinder, a longitudinal partition dividing and cutting off one portion of the cylinder from the other portion at any stage in its rotation, and shoes upon the ends of the longitudinal partition to form a sliding joint between the said ends and the inner face of the rotating cylindrical shell.

4. Perforated cylinders and bearings therefor for use in apparatus for the treatment of textile materials contained between the bands of a double conveyor, comprising an outer perforated shell, end closers for the said shell, a bearing for each end of the shell, upon which the cylinder may rotate, one of the bearings being recessed to receive the end of a fixed central tubular shaft and the other having a central bore to allow of access of fluid to the said shaft, strengthening webs and transverse members on the said tubular shaft, openings in the said shaft to allow of the access of said fluid to the interior of the cylinder, a longitudinal partition dividing and cutting off one portion of the cylinder from the other portion at any stage in the rotation, and shoes upon the ends of the longitudinal partition to form a sliding joint between the said ends and the inner face of the rotating cylindrical shell.

In testimony whereof we have hereunto set our hands.

JOHN BRANDWOOD.
THOMAS BRANDWOOD.
JOSEPH BRANDWOOD.